(No Model.) 2 Sheets—Sheet 1.

M. H. NEWVILLE.
FARM GATE.

No. 372,760. Patented Nov. 8, 1887.

(No Model.) 2 Sheets—Sheet 2.

M. H. NEWVILLE.
FARM GATE.

No. 372,760. Patented Nov. 8, 1887.

Witnesses:
J. C. Tate,
R. H. Orwig.

Inventor:
Miles H. Newville,
By Thomas G. Orwig, Atty.

UNITED STATES PATENT OFFICE.

MILES H. NEWVILLE, OF ALGONA, IOWA, ASSIGNOR OF ONE-HALF TO IGNATZ WERNERT, OF SAME PLACE.

FARM-GATE.

SPECIFICATION forming part of Letters Patent No. 372,760, dated November 8, 1887.

Application filed April 11, 1887. Serial No. 234,450. (No model.)

*To all whom it may concern:*

Be it known that I, MILES H. NEWVILLE, a citizen of the United States of America, and a resident of Algona, in the county of Kossuth and State of Iowa, have invented a new and useful Improvement in Farm-Gates, of which the following is a specification.

My invention relates to the manner of suspending and hinging a gate so that it can slide and swing; and my invention consists in the construction and combination of an extensible hinge-iron, a guard, and a roller with a fixed post and gate, as hereinafter set forth, pointed out in my claim, and illustrated in my drawings, in which—

Figure 1:
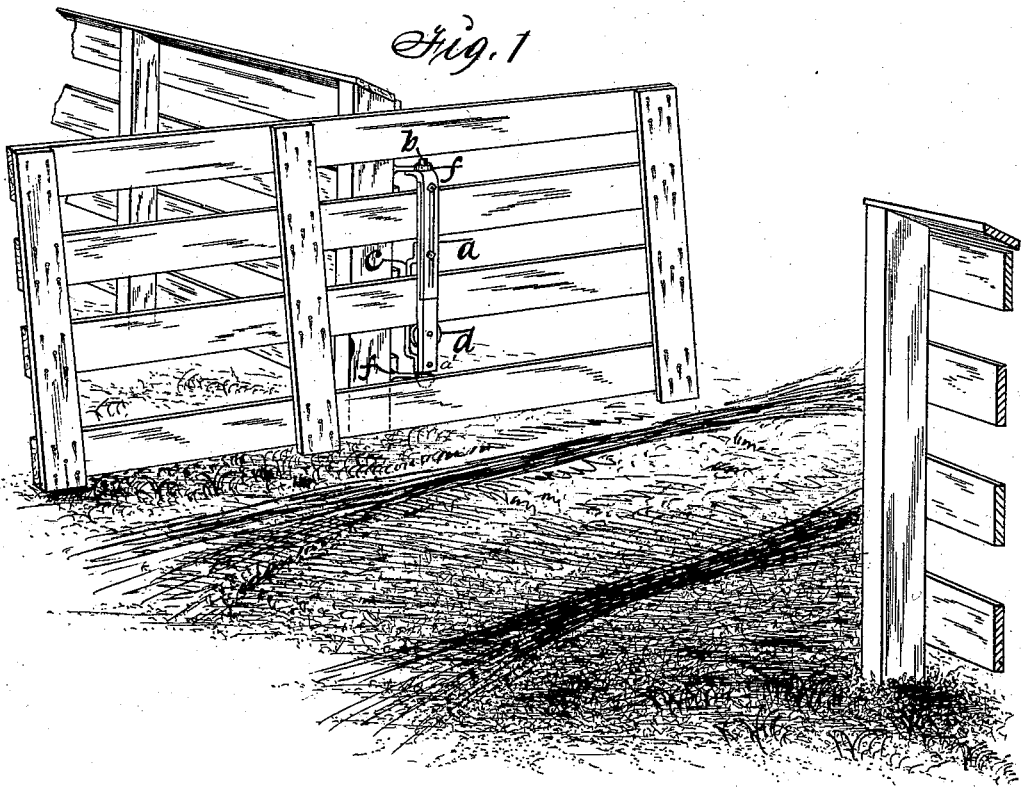
Figure 2:
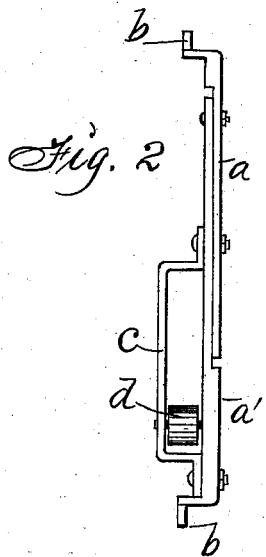
Figure 3:
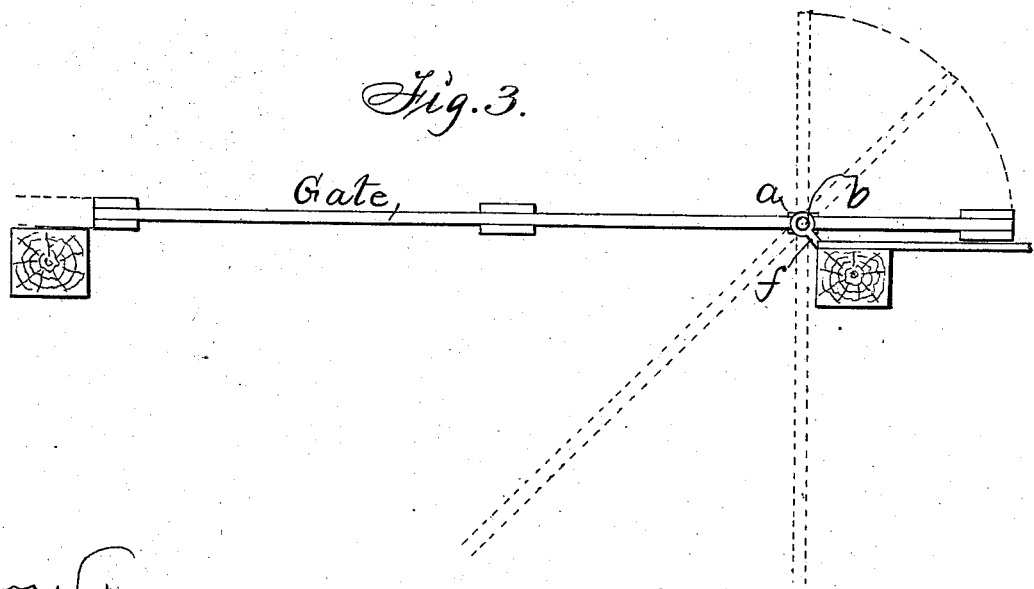

Figure 1 is a perspective view showing my device applied as required for practical use. Fig. 2 is a view showing the extensible hinge-iron, guard, and roller combined. Fig. 3 is a top view showing position of the gate relative to the gate-posts when the gate is closed.

My hinge-iron is made of two overlapping parts. Each piece is bent at right angles at one end and has a journal, $b$. The upper piece, $a$, has a slot through which bolts are passed into perforations in the lower piece, $a'$, in such a manner that the overlapping parts can be clamped rigidly together and the entire iron lengthened and shortened at pleasure to suit different gates.

$c$ is a guard, in the form of a metal loop, bolted to the overlapping irons $a\ a'$.

$d$ is a roller pivoted between the guard $c$ and iron $a'$ in such a manner that a vertical line through the center of the roller will coincide with the axis of each journal $b$, as required, to retain a gate perpendicular when supported upon the roller and hinged and suspended to a post by means of the irons $a\ a'$.

$f\ f$ are eyebolts fixed to the corners of a gate-post to extend horizontally at an angle, as shown in Fig. 3, one near the top and the other near the bottom of the post, in such a manner that their eyes will coincide and serve as bearings for the journals $b$ of the hinge-irons, as required to allow a gate suspended in the hinge-iron to slide and swing relative to the post.

I am aware that a straight bar has had journals on its ends and a guard and roller combined therewith in such a manner that a gate could be hinged and suspended to a post therewith to slide and swing; but the gate was entirely on one side of the axis of the journals and its center of gravity out of line with the journals and bearing outward to bind and strain the hinge, whereas my manner of forming a hinge-iron in two overlapping parts having bends at their ends and journals in line with the vertical center of the roller and a gate supported upon the roller is novel and advantageous.

I claim as my invention—

The extensible gate-hinge comprising two overlapping irons, $a$, slotted and adjustably connected by bolts having lateral bends at their ends and journals $b$, a guard, $c$, and roller $d$, constructed and combined with a gate and gate-post, substantially as shown and described, for the purposes stated.

MILES H. NEWVILLE.

Witnesses:
 I. WERNERT,
 F. M. TAYLOR.